United States Patent Office 3,459,520
Patented Aug. 5, 1969

3,459,520
PROCESS FOR THE PRODUCTION OF GASES CONTAINING METHANE FROM HYDROCARBONS
George Percival, Solihull, England, assignor to The Gas Council, London, England, a British body corporate
No Drawing. Filed Mar. 5, 1964, Ser. No. 349,752
Int. Cl. C10g *11/28*
U.S. Cl. 48—214                                      6 Claims

ABSTRACT OF THE DISCLOSURE

A process is disclosed for the production of gases containing methane by reaction of paraffinic hydrocarbon vapour, the hydrocarbon having an average of from 4–15 carbon atoms per molecule, with steam by passing a mixture thereof into a bed of nickel catalyst at a temperature of at least 350° C. A portion of the reaction product gas is recycled and mixed with the hydrocarbon vapour-steam mixture prior to passage into the nickel catalyst bed. The catalyst bed is maintained between 400° C. and 600° C. This process enables the life of the catalyst to be prolonged.

---

The invention relates to a process for the production of gases containing methane from hydrocarbons.

In British patent specification No. 820,257 there are described and claimed processes for the production of gases containing methane from mixtures of predominantly paraffinic hydrocarbons wherein the vapour of the hydrocarbons and steam are passed through a bed of a nickel catalyst under atmospheric or superatmospheric pressure, and the hydrocarbon vapour and steam are passed into the catalyst bed at a temperature above 350° C. such that the bed is maintained by the reaction at a temperature within the range 400° C. to 550° C. The reactions cause different temperatures to be established in different regions of the catalyst bed, so that the temperature varies throughout the catalyst, but, according to the invention of specification No. 820,257, the lowest temperature is 400° C. or above and the highest temperature is 550° C. or below.

The pressure employed may be up to 50 atmospheres, but may be higher if desired. Convenient pressures are within the range of 10 to 25 atmospheres.

In conjunction with the proportions of steam to distillate which are described in our prior specification, whereas the lower temperature limit of 400° C. was specified to minimise loss of catalyst activity, the upper limit of 550° C. was specified to avoid carbon deposition on the catalyst. However, further experimentation has shown that it is possible to carry out the reaction with a part of the catalyst bed at a maximum temperature above 550° C. for example, 558° C.; temperatures of, for example, up to 575° C. or 600° C. can be established without deposition of the carbon on, or loss of life of, the catalyst or other adverse effects. Such temperature conditions are particularly likely to be encountered when preheat temperatures are substantially above 350° C., for example 500° C., and when the steam to distillate ratio is low.

The proportion of steam is greater than that which decomposes during the reaction and the excess of steam required depends on the average molecular weight of the hydrocarbons used and increases with an increase in molecular weight. However, the excess is not great, and 1.6 parts by weight of steam to 1 part by weight of hydrocarbons can be used with all mixtures of hydrocarbons containing an average of 4 to 15 carbon atoms per molecule. Since there is an excess of steam, the gases leaving the catalyst bed will always contain a proportion of water vapour, and, in the case of the reaction at 20 atmospheres pressure and 535° C. employing 1.6 parts by weight of steam to 1 part by weight of hydrocarbon, 4.65 mols of steam will be present in the product gas per mol of distillate supplied. The composition of the resulting gases is controlled by chemical equilibria and therefore the proportion of steam present in the gases will remain unchanged provided that the working temperature, working pressure and ratio of reactants also remain unchanged.

It has now been found that in carrying out the hydrocarbon steam reaction in the manner described in the said specification the life of the catalyst is limited. The life of the catalyst is shorter the higher the average molecular weight of the hydrocarbon used. The present invention is based upon our observation that the life of the catalyst can be considerably increased by recirculating hot reaction gases containing water vapour through the catalyst bed mixed with the hydrocarbon vapour and steam being supplied.

According to the present invention, therefore, there is provided a process for the production of gases containing methane by reaction of the vapour of paraffinic hydrocarbons having an average of from 4 to 15 carbon atoms per molecule with steam which process comprises passing the hydrocarbon vapour and steam into a bed of a nickel catalyst at a temperature of at least 350° C., whereby hot reaction gases are produced which contain steam, and recycling a proportion of the reaction gases and mixing them with the hydrocarbon vapour and steam to be reacted prior to passage of the mixture through the bed of nickel catalyst, whereby the bed is maintained at temperatures of from 400° C. to 575° C. or 600° C., when substantially no carbon deposition takes place on the catalyst. Under normal operating conditions no carbon is deposited on the catalyst.

The ratio of the reaction product gases removed from the system to the recycled portion of the reaction product gases is one volume to 0.5 to 50 volumes, and preferably one volume to 2 to 10 volumes.

The mixture of hydrocarbon vapour and steam is preferably passed through the bed of nickel catalyst at a linear velocity of from about 0.4 feet/second to about 1.7 feet/second. The term "linear velocity" is used herein to denote a velocity calculated by measuring the volume of the mixture entering the bed in unit time and the volume of the mixture leaving the bed in unit time, correcting the volumes for the difference in temperature between the ingoing and outgoing mixtures, taking the mean of these volumes, and calculating the linear velocity from the mean volume (regarding the vessel containing the catalyst as being empty for this calculation).

The hydrocarbon vapour need not consist wholly of paraffinic hydrocarbons and may conveniently be obtained by vaporisation of light petroleum distillate. The product gases may be mixed with the hydrocarbon vapour and steam prior to preheating.

The reacting gases having reached equilibrium at the catalyst temperature do not cause any marked change in temperature when they are brought back into contact with the catalyst during recirculation. Therefore when gases are recirculated the subsequent mixture with steam and distillate can be preheated, if desired, to a higher temperature than would otherwise be possible to give a product gas containing more hydrogen indeed if desired the mixture can be heated to a temperature approaching 600° C. without that temperature being exceeded in the catalyst bed. Alternatively, the recirculated reaction gases may be cooled before being mixed with the ingoing mixture of steam and hydrocarbon to give a product gas containing more methane.

The recycling of reaction gases containing water vapour enables the proportion of water vapour and distillate to be varied in the mixture of gases passing over the catalyst. Recycling, therefore, provides a means of increasing the proportion of water vapour in contact with the catalyst without increasing the proportion of steam supplied in the mixture of reactants. The effect of recycling the reaction gases from the steam-hydrocarbon gasification stage on the proportion of steam in contact with the catalyst is given in the following Table I.

TABLE I

| Recycle ratio | 0 | 2 | 5 | 10 | 50 |
| --- | --- | --- | --- | --- | --- |
| Distillate, mols | 1.0 | 1.0 | 1.0 | 1.0 | 1.0 |
| Reactant steam, mols | 8.43 | 8.43 | 8.43 | 8.43 | 8.43 |
| Recycle steam, mols | | 9.31 | 23.27 | 46.53 | 232.6 |
| Total steam | 8.43 | 17.74 | 31.70 | 54.96 | 241.3 |
| Steam/distillate | 8.43 | 17.74 | 31.70 | 54.96 | 241.03 |

The values relate to a working temperature of 535° C., a working pressure of 20 atmospheres, and a steam of distillate proportion of 1.6 by weight in the fresh reactants. The recycle ratio is the number of volumes of wet reaction gas recycled per unit volume of wet gas removed from the system. The use of recycling of reaction gases in accordance with this invention is particularly advantageous when high boiling distillates are gasified with the minimum of process steam.

The invention is not limited to the particular catalyst described in British patent specification No. 820,257, but is suitable for any nickel catalyst which may be used for the initial gasification reaction described therein.

Following is a description by way of example of processes in accordance with the present invention. The examples are in pairs and Nos. I, III and V are outside the scope of the claims.

EXAMPLE I

A petroleum distillate having an average number of carbon atoms per molecule of 6.1, a boiling range of 26° to 140° C. and a specific gravity at 20° C. of 0.68 was used in Examples I and II, having previously been freed from sulphur compounds to a level of 0.2 part per million. In this example the petroleum distillate was mixed with steam in the proportion of 2 parts by weight of steam to 1 part by weight of distillate vapour. The mixture was preheated to 450° C. and, under a pressure of 350 lbs. per square inch gauge, passed downwardly through a bed of nickel-alumina catalyst 12 inches deep. The nickel-alumina catalyst was prepared in accordance with the description of British patent specification No. 820,257. The mixture was passed through the bed at a space velocity of 44,000 vols./vol./hr. and a linear velocity of 1.65 ft./sec. until undecomposed distillate first appeared in the gases leaving the tube, this being regarded as the termination of the experiment.

EXAMPLE II

Identical distillate to that used in Example I was mixed with the same proportion of steam, preheated to 450° C. and, under a pressure of 350 lbs./sq. in. gauge, passed downwardly over a similar catalyst together with recirculated reaction gases in a proportion of 2 volumes of wet reaction gas per unit volume of wet gas removed from the system.

The results of the two examples are compared below in Table 2.

Table 2

| Recycle ratio: | Time elapsing to appearance of undecomposed distillate |
| --- | --- |
| 0 | 260 hours. |
| 2 | No deterioration of catalyst detected after 550 hours. |

The composition of the gases produced was:

| | Percent by volume |
| --- | --- |
| $CO_2$ | 11.05 |
| CO | 0.45 |
| $H_2$ | 8.50 |
| $CH_4$ | 31.10 |
| $H_2O$ | 48.80 |

The mol ratio of steam to distillate in the mixture reaching the catalyst in each example was as follows:

| Example— | Mol steam/mol distillate |
| --- | --- |
| 1 | 10.5 |
| 2 | 25.2 |

EXAMPLE III

A petroleum distillate having an average number of carbon atoms per molecule of 7.23, a boiling range of 28° C. to 165° C. and a specific gravity at 20° C. of 0.71 was used in both Example III and Example IV. The distillate was freed from sulphur compounds to a level of 0.2 part per million and mixed with steam in the proportion of 1.6 parts by weight of steam to 1 part by weight of distillate vapour. The mixture, preheated to 450° C. and under a pressure of 350 lbs./sq. in. gauge, was passed downwardly through a bed of nickel-alumina catalyst 12 inches deep. The nickel-alumina catalyst was prepared in accordance with the description of British patent specification No. 820,257. The mixture was passed through the bed at a linear velocity of 0.71 ft./sec. until undecomposed distillate first appeared in the gases leaving the tube, this being regarded as the termination of the experiment.

EXAMPLE IV

The identical distillate to that used in Example III was mixed with the same proportion of steam, preheated to 450° C. and, under a pressure of 350 lb./sq. in. gauge, passed downwardly over a similar catalyst together with recirculated reaction gases in a proportion of 2 volumes of wet reaction gas per unit volume of wet gas removed from the system.

The results of Examples III and IV are compared below in Table 3.

Table 3

| Recycle ratio: | Time elapsing to appearance of undecomposed distillate (hours) |
| --- | --- |
| 0 | 95 |
| 2 | 210 |

The composition of the gases produced was:

| | Percent by volume |
| --- | --- |
| $CO_2$ | 12.1 |
| CO | 0.6 |
| $H_2$ | 9.4 |
| $CH_4$ | 35.6 |
| $N_2$ | 0.6 |
| $H_2O$ | 41.7 |
| | 100.0 |

The mol ratio of steam to distillate in the mixture reaching the catalyst in each example was as follows:

| Example— | Mols steam/mol distillate |
| --- | --- |
| 3 | 9.4 |
| 4 | 19.43 |

EXAMPLE V

A petroleum distillate having an average number of carbon atoms per molecule of 9.97, a boiling range of 110° C. to 240° C. and a specific gravity at 20° C. of 0.79 was used in both experiments. In this example the petroleum distillate was freed from sulphur compounds to a level of <0.2 part per million and mixed with steam in the proportion of 2 parts by weight of steam to 1 part by weight of distillate vapour. The mixture was preheated to 530° C. and, under a pressure of 350 lbs. per sq. in.

gauge, passed downwardly through a bed of nickel-alumina catalyst 12 inches deep. The nickel-alumina catalyst was prepared in accordance with the description of British patent specification No. 820,257. The mixture was passed through the catalyst bed at a linear velocity of 0.43 ft./sec. until undecomposed distillate first appeared in the gases leaving the tube, this being regarded as the termination of the experiment.

EXAMPLE VI

In this example, identical distillate was mixed with the same proportion of steam, preheated to 530° C., and, under a pressure of 350 lbs./sq. in. gauge, passed downwardly over a similar catalyst together with recirculated reaction gases in a proportion of 3 volumes of wet reaction gas per volume of wet gas removed from the system.

The results of the two examples are compared below in Table 4.

Table 4

| Recycle ratio: | Time elapsing to appearance of undecomposed distillate (hours) |
|---|---|
| 0 | 160 |
| 3 | 360 |

The composition of the gases produced was:

| | Percent by volume |
|---|---|
| $CO_2$ | 12.15 |
| $CO$ | 0.65 |
| $H_2$ | 10.6 |
| $CH_4$ | 31.0 |
| $N_2$ | 0.2 |
| $H_2O$ | 45.4 |
| | 100.0 |

The mol ratio of steam to distillate in the mixture reaching the catalyst in each example was as follows:

| Example— | Mols steam/mol distillate |
|---|---|
| 5 | 6 |
| 15.5 | 49.0 |

I claim:
1. A process for the production of gases containing methane by reaction of the vapour of paraffinic hydrocarbons having an average of from 4 to 15 carbon atoms per molecule with steam which process comprises passing a mixture of hydrocarbon vapour and steam into a bed of nickel catalyst at a temperature of at least 350° C. whereby hot reaction gases are produced which contain steam, and recycling a portion of the reaction product gases and mixing them with the mixture of hydrocarbon vapour and steam to be reacted prior to passage of the mixture through the bed of nickel catalyst, the ratio of the recycled portion of the reaction product gases to the reaction product gases removed from the system being 0.5–50 volumes to one volume, said bed being maintained at temperatures of from 400° C. to 600° C. and substantially no carbon deposition takes place on the catalyst.

2. A process as claimed in claim 1 wherein the ratio of reaction product gases removed from the system to the recycled portion of the reaction product gases is one volume to 2–10 volumes.

3. A process as claimed in claim 1 wherein maximum temperature maintained in the catalyst bed is 575° C.

4. A process as claimed in claim 1 wherein the hydrocarbon vapour is obtained by vaporisation of light petroleum distillate.

5. A process as claimed in claim 1 wherein the combined recycled reaction product gases and the mixture of hydrocarbon vapour and steam is preheated prior to being passed into said bed of nickel catalyst.

6. A process for the production of gases containing methane by reaction of the vapour of petroleum distillate having an average number of carbon atoms per molecule of from about 6 to about 10 and a boiling range of from not less than about 20° C. to not more than about 250° C. with steam which process comprises mixing the vapour with at least 1.6 parts by weight of the steam per part of vapour, heating the mixture to a preheat temperature of from about 400° C. to about 550° C. passing the preheated mixture through a bed of nickel catalyst at a linear velocity of from about 4.4 ft./sec. to about 1.7 ft./sec. recycling a portion of the reaction product gas and combining it with said mixture of petroleum distillate vapour and steam, the volume ratio of said recycled portion to product gas removed from the system being 2–3 volumes to one volume prior to its passage through the bed of nickel catalyst, said bed being maintained at a temperature above 400° C. such that no carbon deposition takes place on the catalyst, and recovering the methane-containing reaction product gas by removal of excess steam.

References Cited

UNITED STATES PATENTS 2,942,958   6/1960   Dwyer _____ 48—196

FOREIGN PATENTS 820,257   9/1959   Great Britain.

JOSEPH SCOVRONEK, Primary Examiner

U.S. Cl. X.R.

48—197, 213